March 8, 1960     T. J. TUREK     2,927,984
FLUID PRESSURE SWITCH
Filed Aug. 20, 1958
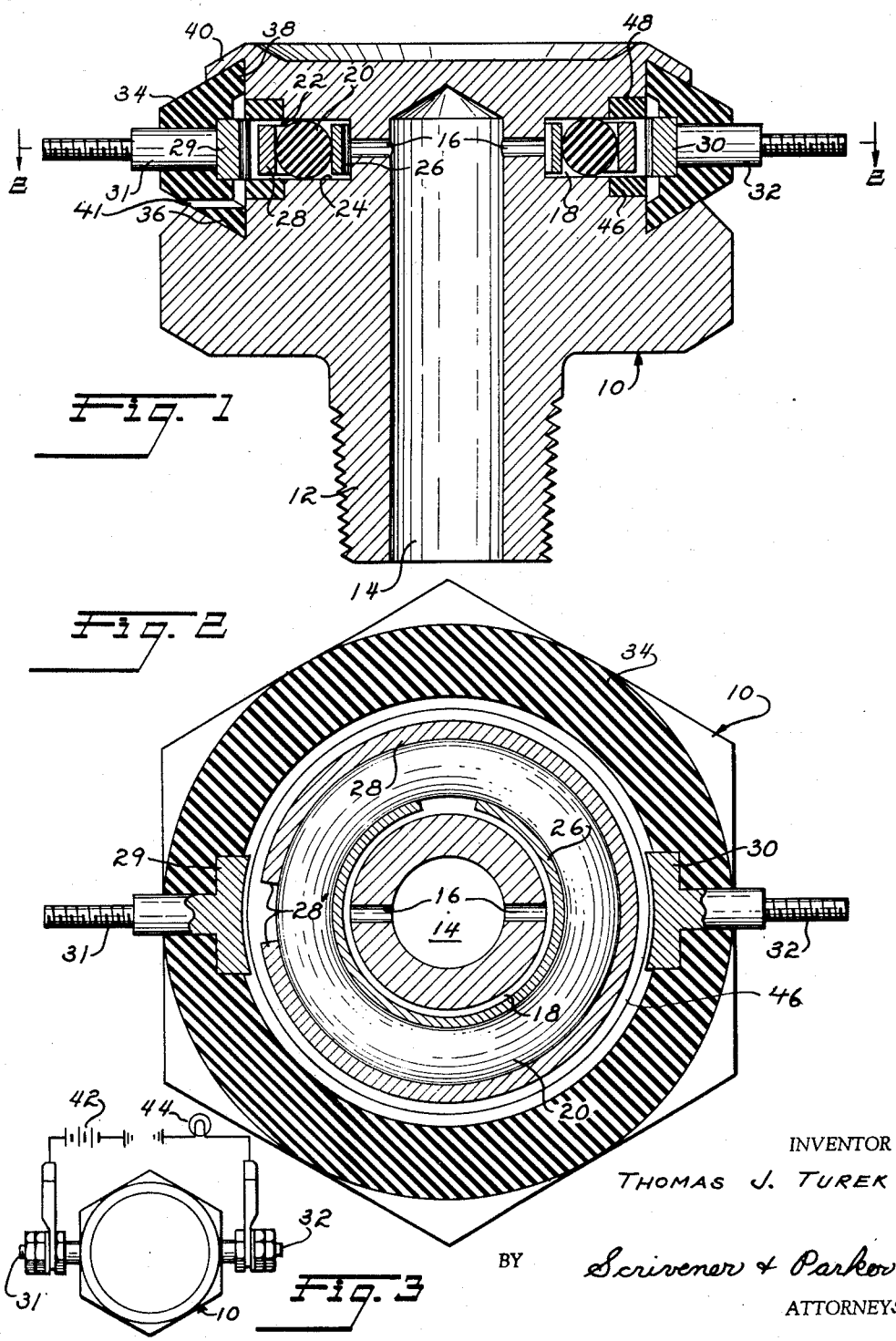
INVENTOR
THOMAS J. TUREK
BY Scrivener & Parker
ATTORNEYS

2,927,984
FLUID PRESSURE SWITCH

Thomas J. Turek, Elyria, Ohio, assignor to Bendix-Westinghouse Automotive Air Brake Company, Elyria, Ohio, a corporation of Delaware Application August 20, 1958, Serial No. 756,206

7 Claims. (Cl. 200—82)

This invention relates to fluid pressure devices and more particularly to fluid pressure operated switches particularly, though by no means exclusively, adapted for use in automotive fluid pressure brake systems for controlling brake signal lamps.

A principal object of the invention is to simplify and improve the construction and operation of fluid pressure operated switches.

Another object of the invention is to provide an easily manufactured, conveniently installed, pressure switch of the expendable or "throw-away" type.

More specifically, it is an object of the invention to provide a fluid pressure operated switch which substitutes for the conventional diaphragm or bellows, a radially expansible member to effect switch closure upon the admission of control pressure to the radially expansible member.

Other objects and their attendant advantages will become apparent as the following detailed description is read in conjunction with the accompanying drawings wherein:

Fig. 1 is a vertical cross-section of a preferred embodiment of the present invention;

Fig. 2 is a horizontal cross-sectional view taken substantially on the line 2—2 of Fig. 1; and Fig. 3 is a schematic view showing the switch of the present invention, on a reduced scale, incorporated in a signal lamp circuit.

Referring now to the drawings, the switch of the invention comprises a metal or molded plastic body 10 having a threaded shank 12 containing an axial passage 14 connected at its upper end by radial passages 16 to control chamber 18 comprising an annular slot machined around the upper end of the body 10. Contained within the slot 18 is an O-type seal ring 20 whose cross-sectional diameter is substantially equal to the vertical spacing between the upper and lower walls 22, 24 of the slot 18. On the inner side of the O-ring 20 there is a split ring 26 of spring material biased to expand radially outwardly and around the periphery of the O-ring there is a second split ring 28 of spring material biased to contract radially inwardly with the biasing force of the ring 28, when combined with the resistance against expansion of the O-ring, being greater than the outwardly biasing force of the inner ring 26 so that the latter, in the no-air position of Fig. 1, is under tension tending to expand radially outwardly.

Mounted in radial alignment with the slot 18 are a pair of switch contacts 29, 30 which are integral with threaded connecting posts 31, 32 secured in an annular insulating ring 34 having preferably a trapezoidal cross-section, the lower inner edge 36 of which is received in a complementary annular groove in body 10, with the upper edge 38 of the ring 34 being clampingly engaged by a flange or lip 40 which is spun over the edge 38 in a well-known manner. A vent 41 connects the space between the O-ring and the insulating ring with atmosphere.

In operation, the pressure switch of the invention is connected by its threaded shank with a fluid pressure control system, as for example, to the service pipe of an air pressure brake system. One of the contact posts 31, 32 is connected to an electrical source, for example, a battery 42 as shown in Fig. 3 and the other contact post is connected to an electrically operated device, as for example, a brake signal lamp 44. When control pressure is admitted to the control system, as when a brake pedal is depressed to admit service pressure to the service pipe, fluid pressure enters the central passage 14 in the body 10 of the switch and flows to the annular control chamber 18 through the radial passages 16 where the pressure exerts a radially outward force on the O-ring 20 causing it and also the outer ring 28 to expand until the latter engages the contacts 29, 30 to complete the circuit between the contacts through an electrical path provided by the ring 28. Since it is possible that the split or gap 28' of the ring 28 (see Fig. 2) may be in registry with one or the other of the contacts 29, 30, the latter are provided with sufficiently wide faces, as clearly shown in Fig. 2, to bridge the gap and ensure electrical connection regardless of the gap's location. With the body 10 made of metal, to avoid short circuits in the event the outer ring cocks in the groove 18, a pair of vertically spaced annular insulating rings 46, 48 are provided above and below the ring 28 as shown in Fig. 1.

As the O-ring expands under the influence of pressure in chamber 18, the inner ring 26, being biased to expand outwardly, follows the O-ring so that the O-ring is squeezed slightly between the inner and outer rings to bulge slightly in the direction of the walls 22, 24 of the slot 18, thus insuring a fluid tight fit between the O-ring and the walls. Inasmuch as the cross-sectional area of the O-ring will decrease in proportion to its radial expansion, in the event the aforementioned bulging effect is insufficient to maintain the desired seal, the walls 22, 24 can converge slightly radially outwardly. Preferably the outer ring 28 is relatively large in cross-section so as to present as small a resistance as practicable to the flow of current through the ring so that the heat generated by the current flow will be relatively small and not harmful to the O-ring.

When control pressure is released from the control system, as upon release of the brake pedal, so that pressure is exhausted from the slot 18, the inward bias of the outer ring 28 in combination with the tendency of the O-ring to contract radially inwardly, causes the ring 28 to move out of engagement with the contacts 29, 30 to open the circuit and de-energize the lamp 44. The O-ring and the rings 26, 28 continue to move radially inwardly until a static position is reached wherein the outer and inner radial forces are balanced. The inner ring 26 is so designed that in its balanced no-air position, its diameter is greater than the diameter of the bottom of the slot 18 so that the ring does not obstruct the flow of fluid pressure through the radial passages 16.

It is within the purview of the invention that in lieu of the O-ring or similar seal, an annular cup ring could be utilized with equal effectiveness. The walls of the cup would preferably face radially inwardly in engagement with the respective walls 22, 24 of the slot as should be apparent to those skilled in the art. In the event point contacts are desired on the inner ends of the contacts 29, 30 the slot 28' in the ring 28 could be utilized to engage a locating pin in the body 10 to insure registry of the point contacts. The foregoing changes in the preferred embodiment of the invention illustrated and described, as well as other modifications or changes, may be resorted to without departing from the scope and spirit of the appended claims.

What is claimed is:

1. A fluid pressure switch comprising a body having a fluid passage therein adapted to be connected to a source of fluid pressure, said body having a stationary annular chamber connected to said fluid passage, an annular radially expansible member freely mounted in said annular chamber adapted to be expanded radially outwardly upon the admission of fluid pressure to said chamber, and electric switch means adapted to be engaged by said member so as to be actuated thereby when fluid pressure is admitted to said chamber to expand said member radially outwardly into engagement with said switch means.

2. A fluid pressure switch comprising a body having a fluid passage therein adapted to be connected to a source of fluid pressure, said body having a stationary annular groove having spaced side walls, an annular radially expansible member freely mounted in said groove sealingly engaging said spaced side walls, fluid conduit means connecting said fluid passage to the inner side of said radially expansible member, electric switch means mounted in said body in radial alignment with said member, said switch means being normally out of engagement with said member but being adapted to be engaged by said member and be actuated thereby upon the admission of fluid pressure to the inner side of said member causing the latter to expand into engagement with said switch means to actuate the same.

3. A fluid pressure switch comprising a body having a fluid passage therein adapted to be connected to a source of fluid pressure, said body having a stationary annular groove having spaced side walls, an annular resilient member freely mounted in said groove slidingly and sealingly engaging said side walls, fluid conduit means connecting said fluid passage with said groove on the inner side of said resilient member, said member upon the admission of fluid pressure to said groove being expansible radially outwardly from a first position to a second position and retracting from said second position to its first position upon the exhaustion of fluid pressure from said groove, and electric switch means in said body engaged by said member upon movement from its first position to its second position.

4. A fluid pressure switch comprising a body having a fluid passage therein adapted to be connected to a source of fluid pressure, said body having a stationary annular groove having spaced side walls, an annular resilient member freely mounted in said groove slidingly and sealingly engaging said side walls, fluid conduit means connecting said fluid passage with said groove on the inner side of said member, a split ring of spring material engaging said member about the periphery thereof, said ring being biased radially inwardly, a plurality of electrical contacts in said body in radial alignment with said groove and normally out of engagement with said split ring, said member being expanded radially outwardly upon the admission of fluid pressure to said groove to move said split ring into engagement with said contacts to complete an electrical circuit from said contacts through said split ring.

5. The fluid pressure switch of claim 4 where the annular member comprises an O-ring.

6. The fluid pressure switch of claim 4 including a second split ring engaging the inner side of said resilient member and biased radially outwardly, its bias being less than the inward bias of said first split ring.

7. The fluid pressure switch of claim 4 wherein said contacts are provided with enlarged heads capable of bridging the split in said ring when in registry with one of said contacts.

References Cited in the file of this patent

UNITED STATES PATENTS

| 2,773,951 | Finlay et al. | Dec. 11, 1956 |
| 2,795,668 | Puckett | June 11, 1957 |